US011518320B2

(12) United States Patent
Marchlewski et al.

(10) Patent No.: US 11,518,320 B2
(45) Date of Patent: Dec. 6, 2022

(54) MULTI-PANEL PLATFORM SUPPORT FOR PICK-UP TRUCK BED

(71) Applicant: Ford Global Technologies, LLC, Dearborn, MI (US)

(72) Inventors: Jack Marchlewski, Saline, MI (US); Vincent Anthony Chimento, Plymouth, MI (US); Dragan B. Stojkovic, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 144 days.

(21) Appl. No.: 17/146,418

(22) Filed: Jan. 11, 2021

(65) Prior Publication Data

US 2022/0219624 A1 Jul. 14, 2022

(51) Int. Cl.
*B62D 25/20* (2006.01)
*B62D 33/023* (2006.01)
*B60R 13/01* (2006.01)

(52) U.S. Cl.
CPC .......... *B60R 13/01* (2013.01); *B62D 25/2054* (2013.01); *B62D 33/023* (2013.01); *B60R 2013/018* (2013.01)

(58) Field of Classification Search
CPC .. B62D 33/02; B62D 33/023; B62D 25/2054; B60R 13/01; B60R 2013/016; B60R 2013/018
USPC .......................................... 296/183.1, 186.1
See application file for complete search history.

(56) References Cited

U.S. PATENT DOCUMENTS

| | | | | |
|---|---|---|---|---|
| 4,215,898 | A | 8/1980 | Ulics | |
| 4,333,678 | A * | 6/1982 | Munoz | B60R 13/01 220/4.28 |
| 4,592,583 | A * | 6/1986 | Dresen | B60R 13/01 296/39.2 |
| 4,767,149 | A | 8/1988 | Rye | |
| 4,958,876 | A * | 9/1990 | Diaco | B60R 13/01 410/144 |
| 5,540,473 | A * | 7/1996 | Bills, Sr. | B60R 13/01 296/39.2 |
| 5,660,427 | A * | 8/1997 | Freeman | B62D 33/02 296/183.1 |
| 5,720,507 | A * | 2/1998 | Emery | B60R 13/01 410/129 |
| 5,788,309 | A * | 8/1998 | Emery | B60P 7/15 410/152 |
| 5,871,316 | A | 2/1999 | Bills | |

(Continued)

*Primary Examiner* — Gregory A Blankenship
(74) *Attorney, Agent, or Firm* — Vichit Chea; Carlson, Gaskey & Olds, P.C.

(57) ABSTRACT

A vehicle includes a two-panel support structure for each side of a bed of a pick-up truck. Each side includes an upper panel and a lower panel between the upper panel and the bed. The upper panel includes multiple indentations from a cab-side to a tailgate side of the bed. The lower panel includes a plurality of extensions that extend into one or more of the multiple indentations. The combination of each indentation and extension creates a pocket into which a platform, board, or other support structure, such as cross-brace, can be placed. The support structure can extend from one indentation on one side to a corresponding indentation on another side of the bed. The support structure creates support in conjunction with other support structures for a larger platform, such as a piece of plywood the size of the bed.

18 Claims, 6 Drawing Sheets

(56) References Cited

U.S. PATENT DOCUMENTS

| | | | | | |
|---|---|---|---|---|---|
| 5,938,272 | A * | 8/1999 | Jurica | ............... | B62D 65/02 |
| | | | | | 296/184.1 |
| 6,347,454 | B1 * | 2/2002 | Jurica | ............... | B62D 25/2054 |
| | | | | | 72/379.6 |
| 6,478,356 | B1 * | 11/2002 | Wayne | ............... | B60R 11/06 |
| | | | | | 296/39.2 |
| 6,742,832 | B1 * | 6/2004 | Miskech | ............... | B62D 33/02 |
| | | | | | 216/36 |
| 7,059,647 | B1 * | 6/2006 | Sierakowski | ............... | B60R 13/01 |
| | | | | | 296/37.6 |
| 7,229,115 | B2 * | 6/2007 | Wilson | ............... | B60R 13/01 |
| | | | | | 410/129 |
| 7,232,172 | B2 * | 6/2007 | Kiester | ............... | B60P 7/14 |
| | | | | | 296/26.08 |
| 7,275,784 | B2 * | 10/2007 | McNulty | ............... | B62D 33/023 |
| | | | | | 296/183.1 |
| 7,284,787 | B2 * | 10/2007 | McNulty | ............... | B62D 25/16 |
| | | | | | 296/183.1 |
| 7,703,826 | B1 * | 4/2010 | German | ............... | B60P 7/0815 |
| | | | | | 410/104 |
| 7,971,919 | B2 * | 7/2011 | Vertanen | ............... | B60P 3/423 |
| | | | | | 410/32 |
| 9,090,195 | B2 * | 7/2015 | Peters | ............... | B60P 7/14 |
| 9,120,510 | B1 * | 9/2015 | Gillam | ............... | B60R 9/02 |
| 10,106,207 | B2 * | 10/2018 | Fassezke | ............... | B60R 13/01 |
| 10,793,201 | B1 * | 10/2020 | Johnston, VII | ............... | B32B 5/024 |
| 2005/0057073 | A1 * | 3/2005 | Hunt | ............... | B62D 33/0273 |
| | | | | | 296/183.1 |
| 2005/0057074 | A1 * | 3/2005 | Augustine | ............... | B62D 25/2054 |
| | | | | | 296/183.1 |
| 2005/0225117 | A1 * | 10/2005 | Miskech | ............... | B62D 33/0273 |
| | | | | | 296/183.1 |
| 2007/0046056 | A1 * | 3/2007 | Delaney | ............... | B62D 29/043 |
| | | | | | 296/37.6 |
| 2013/0094930 | A1 * | 4/2013 | Kalergis | ............... | B60P 1/435 |
| | | | | | 296/183.1 |
| 2016/0288725 | A1 * | 10/2016 | Sterling | ............... | B62D 33/023 |
| 2022/0119040 | A1 * | 4/2022 | Gray | ............... | B62D 27/02 |
| 2022/0212726 | A1 * | 7/2022 | Hewitt | ............... | B62D 33/023 |
| 2022/0219624 | A1 * | 7/2022 | Marchlewski | ............... | B62D 33/023 |

* cited by examiner

MULTI-PANEL PLATFORM SUPPORT FOR PICK-UP TRUCK BED

BACKGROUND

Technical Field

The present disclosure is directed to a two-panel support structure for sides of a pick-up truck bed that support a platform.

Description of the Related Art

Pick-up trucks are often used for carrying and transporting a variety of different sizes and types of loads. Side walls and beds often include features that provide different options to transport loads, such as pockets in top surfaces of sidewalls that can receive and hold stakes or interior features that provide a support for a platform to create a two-tier load surface within the bed.

BRIEF SUMMARY

The present disclosure is directed to a two-panel support structure for each side of a bed of a pick-up truck, and each side includes a first, upper panel and a second, lower panel. The upper panel is coupled between the lower panel and a top surface of the side of the bed and the lower panel is coupled between the upper panel and a bed floor or liner.

The upper panel includes a plurality of indentations or recesses that extend along the side from a cab-side of the bed to a tailgate side of the bed. The lower panel includes a plurality of extensions or protrusions that extend into or combine with the plurality of indentations. The combination of each indentation and extension acts as a support into which a platform, board, or other support structure can be placed. The support structure may extend from one side of the bed to the other, that is from one indentation on a first side to a corresponding indentation on a second side. The support structure, in conjunction with other support structures, creates a shelf or a support for a larger platform, such as a piece of plywood of the size of the bed.

In some embodiments, a vehicle includes a bed floor, a first side comprising a first panel and a second panel that is between a third panel and the bed floor, and a second side spaced from the first side by the bed floor. The second side includes a third panel and a fourth panel that is between the third panel and the bed floor.

In some other embodiments, a vehicle includes a passenger compartment, a tailgate, a bed floor between the passenger compartment and the tailgate. A side extends between the passenger compartment and the tailgate, the side extends away from and is coupled to the bed floor. The side includes a first panel having a first indentation, and a second panel between the first panel and the bed floor. The second panel has a first extension that extends into the first indentation.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with vehicles have not been shown or described in detail to avoid unnecessarily obscuring descriptions of the embodiments.

Figure 1A:
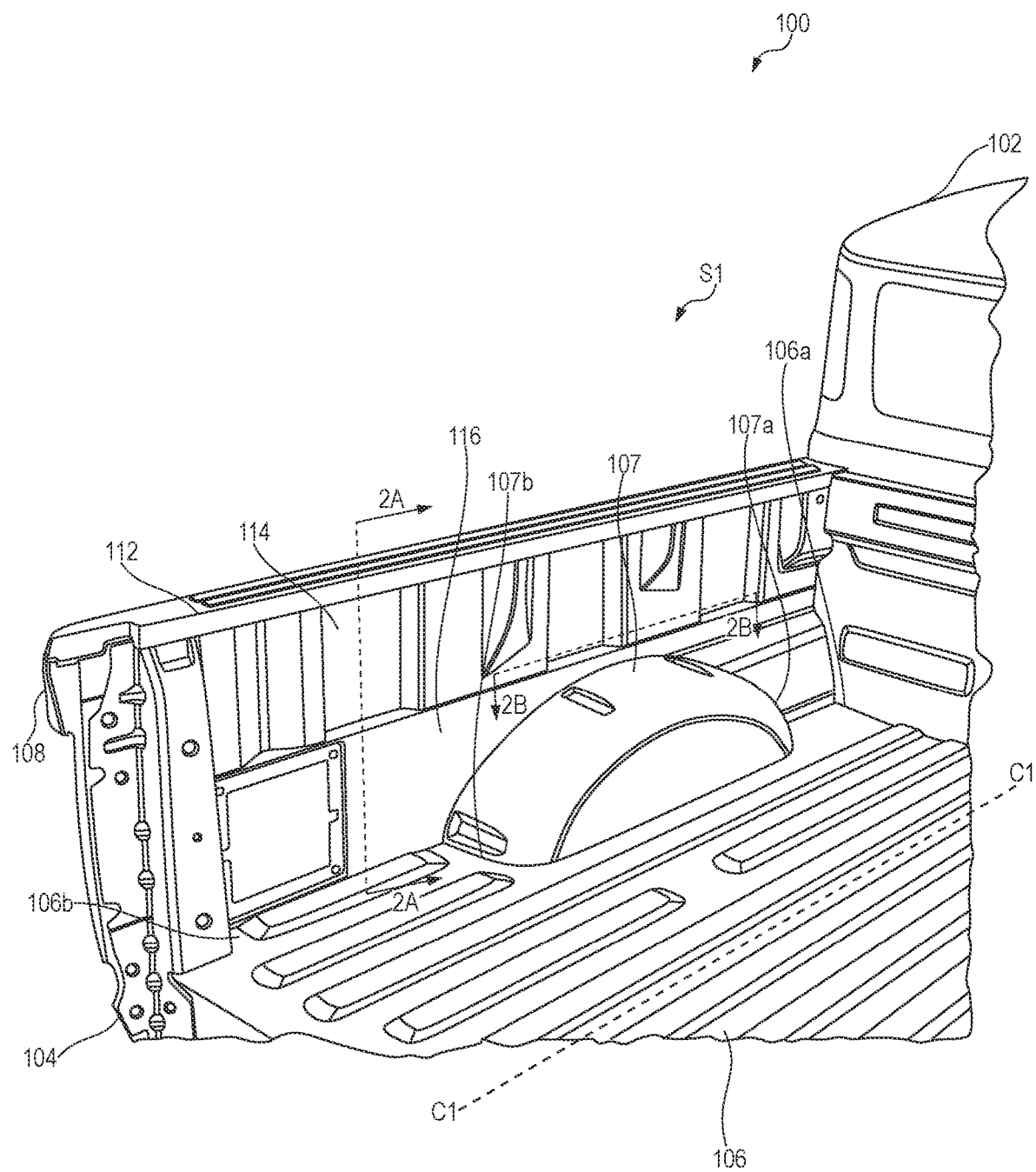
FIG. 1A is a rear perspective view of a vehicle with a set of panels on a first side of the vehicle according to an embodiment of the present disclosure.
Figure 1B:
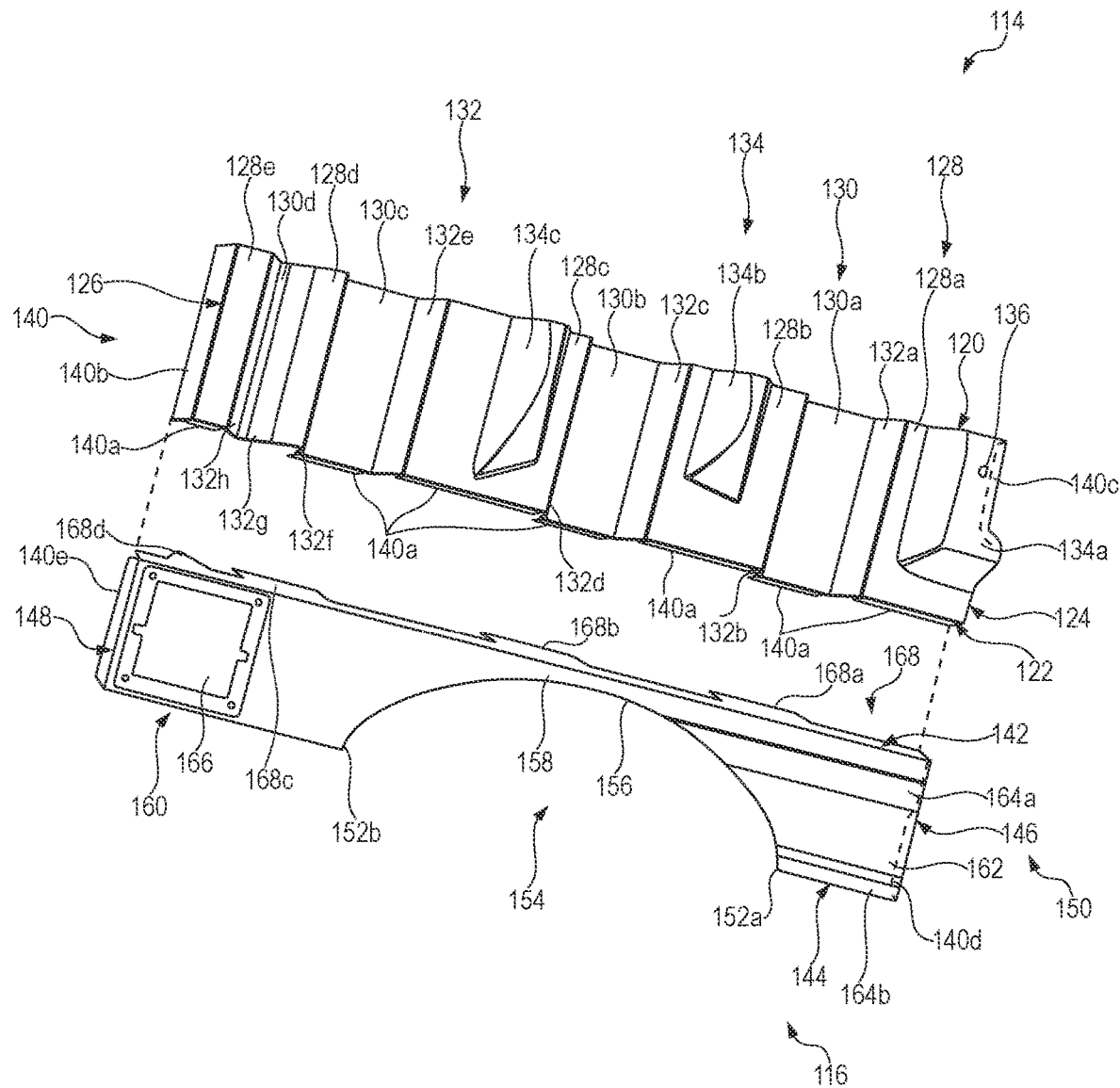
FIG. 1B is an exploded view of the set of panels of FIG. 1A.

FIG. 1A is a rear perspective view of a vehicle 100 with a set of panels 114, 116 on a first side 108 of the vehicle 100. FIG. 1B is an exploded view of the set of panels 114, 116 positioned on the first side 108 of the vehicle 100. The vehicle 100 can be a pick-up truck and includes a passenger compartment 102 on a front end and a tailgate 104 on a rear end. The vehicle 100 includes a bed floor 106 that extends between the passenger compartment 102 and the tailgate 104. The first side 108 and a second side (not shown) of the vehicle 100 are substantially perpendicular to the bed floor 106 and extend between the passenger compartment 102 and the tailgate 104. The first side 108 is adjacent to a driver-side S1 of the vehicle 100. The first side 108 is spaced from the second side by the bed floor 106. The first side 108 and the second side extend away from and coupled to the bed floor 106.

The first side 108 includes a first cover 112, and the set of panels 114, 116. The upper panel 114 is positioned between the first cover 112 and the lower panel 116. The second side includes a second cover (not shown), an upper, third panel (not shown), and a lower, fourth panel (not shown). The upper panel is positioned between the second cover and the lower panel like the first side 108. The set of panels 114, 116 are parallel to the third and the fourth panels and may be coupled to the first side 108. The panels may be coupled to the respective side by using one or more fasteners or by welding the panels to the sides.

Referring to FIG. 1B, the panel 114 includes a top surface 120 coupled to the first cover 112, illustrated in FIG. 1A, and a bottom surface 122 coupled to the panel 116. The first cover 112 seals the top surface 120. The panel 114 includes side surfaces 124, 126 that may be coupled to the passenger compartment 102 and the tailgate 104, respectively, illustrated in FIG. 1A.

The panel 114 may include a plurality of projections 128 that are first bed-facing surfaces. The plurality of projections 128 extend from the top surface 120 to the bottom surface 122. The plurality of projections 128 may include one or more secondary structures or extensions 134 that face the bed floor 106 or face towards the tailgate. The plurality of projections 128 includes a first projection 128a, a second projection 128b, a third projection 128c, a fourth projection 128d, and a fifth projection 128e. The first, second, and third projections 128a, 128b, and 128c respectively, may include a secondary structure 134a, 134b, and 134c.

The panel 114 includes a plurality of indentations or recesses 130 that are second bed-facing or interior surfaces. The plurality of indentations 130 extend from the top surface 120 to the bottom surface 122. The plurality of indentations 130 is positioned between the passenger compartment 102 and the tailgate 104, that is the plurality of indentations 130 is positioned between the cab-side 106a to the tailgate side 106b of the bed floor 106. The plurality of indentations 130 includes a first indentation 130a, a second indentation 130b, a third indentation 130c, and a fourth indentation 130d. Each of the plurality of projections 128 may be positioned adjacent to at least one indentation of the plurality of indentations 130. The indentations are closer to an outermost edge of the side of the truck as compared to each of the projections. The outer most edge being the exterior panel that is visible from outside the truck.

The first projection 128a is positioned adjacent to the first indentation 130a and is situated between the passenger compartment 102 and the first indentation 130a. The second projection 128b is positioned between the first indentation 130a and the second indentation 130b. Similarly, the third projection 128c is positioned between the indentations 130b, 130c, while the fourth projection 128d is positioned between the indentations 130c, 130d. The fifth projection 128e is positioned between the tailgate 104 of the vehicle 100 and the fourth indentation 130d. The first projection 128a includes an aperture 136 that may be used for coupling the panel 114 to the first side 108 or for coupling a back panel (not shown) to the panel 114.

The plurality of indentations 130 is more distant from a center line C1-C1 of the bed floor 106, illustrated in FIG. 1A, compared to the plurality of projections 128. The one or more secondary structures 134 are closer to the center line C1-C1 of the bed floor 106 as compared to the plurality of projections 128.

The plurality of indentations 130 may be of different shapes and dimensions, such as the fourth indentation 130d has a curved surface while the first, second, and third indentations 130a, 130b, and 130c may have rectangular surfaces. Alternately, the plurality of indentations 130 may be of identical shapes and dimensions.

The plurality of projections 128 may be of different shapes and dimensions. The projections 128d, 128e may have a dimension that can be different from a dimension of the projections 128a, 128b, and 128c. The third projection 128c may have a larger dimension than the projections 128a, 128b. The projections 128d, 128e may not include the one or more secondary structures 134 unlike the projections 128a, 128b, and 128c. Alternately, the plurality of projections 128 may be of identical shape and dimensions and may or may not include the one or more identical secondary structures 134.

The panel upper 114 includes a plurality of sidewalls 132, where each of the plurality of sidewalls 132 are positioned between the plurality of projections 128 and the plurality of indentations 130. The plurality of sidewalls 132 extends from the top surface 120 to the bottom surface 122 of the panel 114. The plurality of sidewalls 132 includes a first sidewall 132a, which is positioned between the first indentation 130a and the first projection 128a, and a second sidewall 132b that is positioned between the first indentation 130a and the second projection 128b. The plurality of sidewalls 132 includes a third sidewall 132c, which is positioned between the second indentation 130b and the second projection 128b, and a fourth sidewall 132d that is positioned in between the second indentation 130b and the third projection 128c. A fifth sidewall 132e is positioned in between the third indentation 130c and the third projection 128c, and a sixth sidewall 132f is positioned in between the third indentation 130c and the fourth projection 128d. Similarly, a seventh sidewall 132g is positioned in between the fourth indentation 130d and the fourth projection 128d, and an eighth sidewall 132h is positioned in between the fourth indentation 130d and the fifth projection 128e.

The plurality of sidewalls 132 may be of different shapes and dimensions. The sidewalls 132g and 132h can have a slope unlike the other sidewalls of the plurality of sidewalls 132 that are substantially perpendicular to the adjacent indentations 130a, 130b, and 130c, respectively. Alternately, the plurality of sidewalls 132 may be of identical shape and dimensions.

The panel 114 includes a plurality of tabs 140 that may support coupling the panel 114 to the first side 108 of the vehicle 100. The plurality of tabs 140 may be rectangular in shape with pointed edges. One or more tabs 140a are positioned adjacent to the indentations 130a, 130b, and 130c, and the projections 128a, 128b, 128c, and 128e on the bottom surface 122 of the panel 114. The tabs 140a on the bottom surface 122 of the panel 114 extend away from the bed floor 106 and towards an exterior wall 109 of the first side 108 (illustrated in FIG. 2A). The panel 114 may also include one or more tabs 140b on the second-side surface 126, extending from the top surface 120 to the bottom surface 122, and between the tailgate 104 and the fifth projection 128e. The panel 114 may also include one or more tabs 140c on the first-side surface 124 extending from the top surface 120 up to at least a quarter portion of the first projection 128a and positioned between the passenger compartment 102 and the first projection 128a. The tabs 140 may be of different shapes and dimensions. Alternately, the fourth indentation 130d, the fourth projection 128d, and the one or more sidewalls of the plurality of sidewalls 132 may also include the tabs 140a on the bottom surface 122.

The lower panel 116 includes a top surface 142 coupled to the bottom surface 122 of the panel 114, and a bottom surface 144 coupled to the bed floor 106, illustrated in FIG. 1A. The panel 116 includes a third-side surface 146 coupled to the passenger compartment 102 and positioned between the first-side surface 124 and the bed floor 106. The panel 116 further includes a fourth-side surface 148 adjacent to the tailgate 104 and between the second-side surface 126 and the bed floor 106. The panel 116 includes portions 150, 160 adjacent to the passenger compartment 102 and the tailgate 104, respectively, of the vehicle 100.

The panel 116 includes a central portion 154 between the portions 150, 160. The central portion 154 may include a curved edge 156 that is coupled to and accommodates a wheel well 107, illustrated in FIG. 1A, of the vehicle 100. The portions 150, 160 are positioned on a cab-side 107a and a tailgate side 107b, respectively, of the wheel well 107. The portion 150 includes a first end 152a and the portion 160 includes a second end 152b. The curved edge 156 of the central portion 154 extends between the first end 152a and the second end 152b. The central portion 154 includes a first-strip portion 158 between a crown of the curved edge 156 and the top surface 142 of the panel 116.

The portion 150 includes a protrusion portion 162 adjacent to the bottom surface 144 of the panel 116. The portion 150 includes a second-strip portion 164a positioned between the protrusion portion 162 and the top surface 142 of the panel 116, and a third-strip portion 164b positioned between the protrusion portion 162 and the bottom surface 144. The protrusion portion 162 is closer to the central line C1-C1 illustrated in FIG. 1A, than the second-strip portion 164a and the third-strip portion 164b. The protrusion portion 162 may accommodate or allow fuel lines or electrical lines that may have to travel from a front end to a rear end of the vehicle 100.

The portion 160 may include an opening 166 that may provide access to the electrical power and allows placement of one or more power outlets or a Universal Serial Bus (USB) outlet at the tailgate 104 of the vehicle 100. The opening 166 may accommodate a speaker or any other equipment.

The third-side surface 146 and the fourth-side surface 148, adjacent to the portions 150, 160 include one or more tabs 140d and one or more tabs 140e respectively that extend away from the bed floor 106. The tabs 140 may stretch partially or completely on the third-side surface 146 and the fourth-side surface 148, respectively. The tabs 140 may aid in coupling the panel 116 to the first side 108 of the vehicle 100.

Figure 2A:
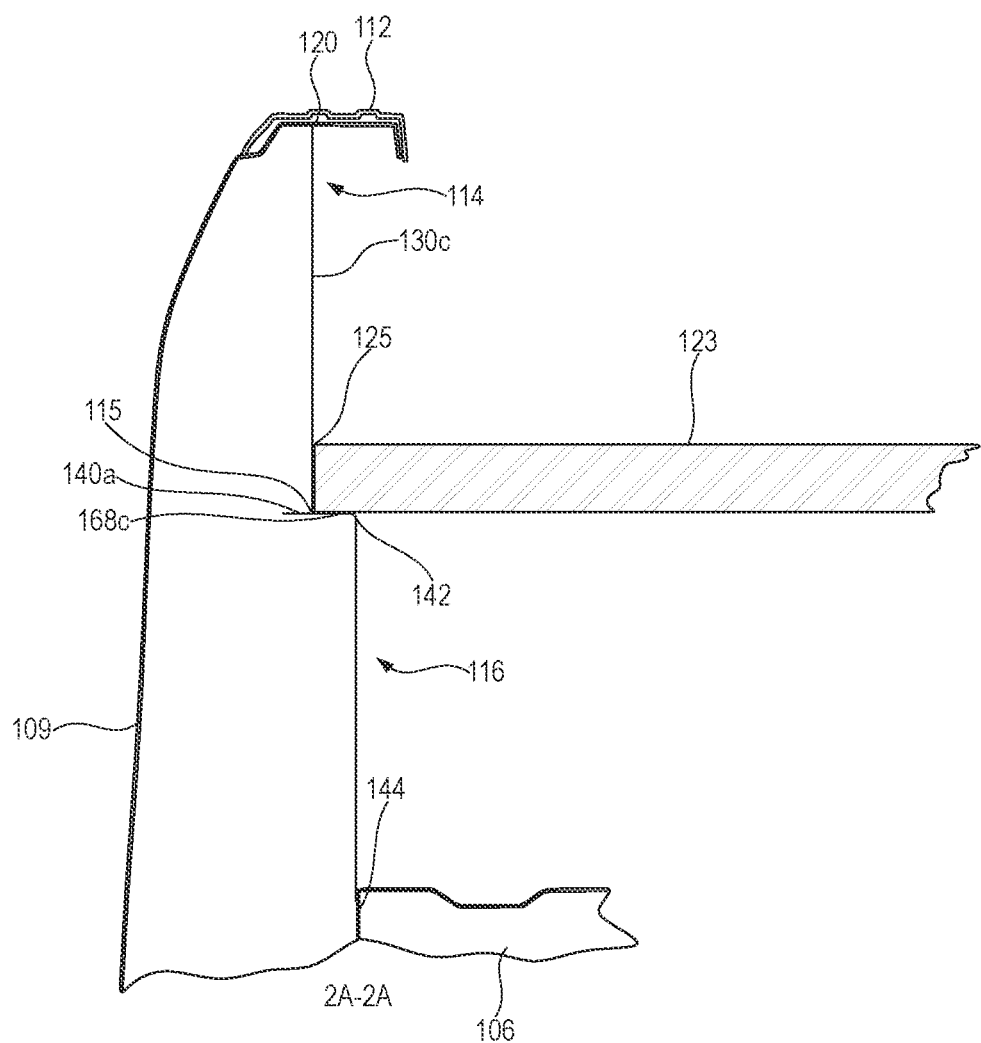
FIG. 2A is a cross-sectional view of the first side of the vehicle along a line 2A-2A of FIG. 1A.

The top surface 142 of the panel 116 includes a plurality of extensions 168 that extend away from the bed floor 106 and towards the exterior wall 109 of the first side 108 (illustrated in FIG. 2A). The plurality of extensions 168 includes a first extension 168a, a second extension 168b, a third extension 168c, and a fourth extension 168d. The shape and dimensions of the first extension 168a correspond to the shape and dimensions of the first indentation 130a. The first extension 168a extends into and couples with the first indentation 130a. The first extension 168a, upon coupling, is adjacent to the bottom surface 122 of the panel 114 and adjacent to the first sidewall 132a and the second sidewall 132b. Similar to the first extension 168a, the second extension 168b, the third extension 168c, and the fourth extension 168d extend inside and are coupled with the second indentation 130b, the third indentation 130c, and the fourth indentation 130d, respectively.

The second extension 168b, upon coupling, is adjacent to the third sidewall 132c and the fourth sidewall 132d, while the second extension 168b is positioned to align with the wheel well 107. The third extension 168c, upon coupling, is adjacent to the fifth sidewall 132e and the sixth sidewall 132f. The fourth extension 168d, upon coupling, is adjacent to the seventh sidewall 132g and the eighth sidewall 132h. The shape and the dimensions of the plurality of extensions 168 conform to the contours of the corresponding plurality of indentations 130 to achieve a snug fit. For example, the fourth extension 168d is a curved extension with the shape and dimensions that correspond with the curved fourth indentation 130d for coupling and achieving the snug fit. The shapes and the dimensions of the plurality of extensions 168 and the plurality of sidewalls 132 may be modified based on the variations of shapes and dimensions of the corresponding plurality of indentations 130 to facilitate coupling.

The third and fourth panels on the second side (not shown) are substantially identical to the panels 114, 116 respectively and the third and fourth panels are coupled to securely abut each other to form an uniform internal wall of the bed of the truck. The combination of a plurality of indentations and extensions (not shown) on the second side are identically positioned with respect to the combination of the plurality of indentations 130 and extensions 168 on the first side 108.

The combination of the plurality of indentations and the extensions on the second side and the combination of the plurality of indentations 130 and the plurality of extensions 168 on the first side 108 create flat horizontal pockets. A supporting structure such as a cross-brace 123, illustrated in FIG. 2A, extends from the first side 108 to the second side over the bed floor 106, with ends of the cross-brace 123 held securely by the flat horizontal pockets on the first side 108 and the second side. The secure hold of the flat horizontal pockets may prevent the supporting structures from shifting while loading or unloading cargo, or during transportation. The cross-brace 123 supported by the panels 114, 116, the third and fourth panels in conjunction with other support structures provide support onto which a platform, board, or other support structure can be placed to form a two tiered-storage.

FIG. 2A is a cross-sectional view of the third indentation 130c and the third extension 168c of the first side 108 along a line 2A-2A of FIG. 1A. The panels 114, 116 are coupled to the first side 108; the specific coupling mechanisms are, however, omitted for the ease of drawing clarity. The panels 114, 116 are positioned as discussed in FIGS. 1A and 1B. The third indentation 130c extends between the top surface 120 and the bottom surface 122. The bottom surface 122 includes the tab 140a that extends away from the bed floor 106 and towards the exterior wall 109. The third extension 168c extends into and couples with the third indentation 130c and is adjacent to the bottom surface 122. The third extension 168c is in-line with and is coupled to the tab 140a and extends away from the bed floor 106 and towards the exterior wall 109. The third indentation 130c and the third extension 168c are coupled by, for example, welding, fasteners, etc., and provide support to a support structure, such as the cross-brace 123.

A first end 125 of the cross-brace 123 is placed at a coupled region 115 of the third indentation 130c and the third extension 168c. The coupling of the third indentation 130c and the third extension 168c may provide support to the cross-brace 123 of a standard size, for example, 2×4, 2×6, etc. Alternately, the third indentation 130c and the third extension 168c are of the shape and dimensions that are customized as per requirements and provide support to the cross-brace 123 of non-standard shapes and sizes.

Figure 2B:
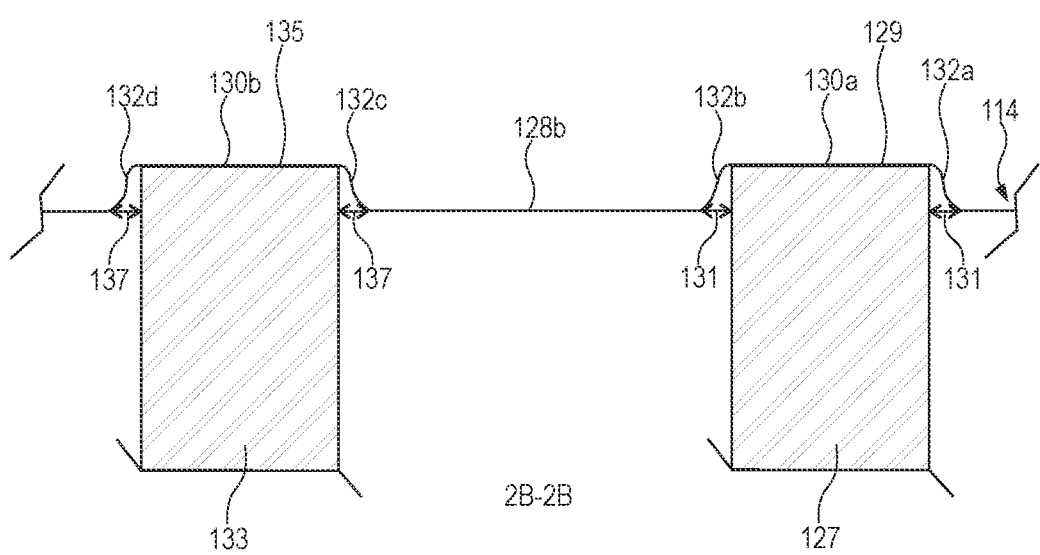
FIG. 2B is a simplified top down view of the first side of the vehicle along a line 2B-2B of FIG. 1A.

FIG. 2B is a top down view of the first side 108 of the vehicle 100 along a line 2B-2B of FIG. 1A. The panel 114, as discussed in FIGS. 1A and 1B, includes the first indentation 130a and the second indentation 130b spaced by the second projection 128b. Each combination of the coupling of the first indentation 130a with the first extension 168a and coupling of the second indentation 130b with the second extension 168b provides support to a cross-brace 127 and a cross-brace 133, respectively, as shown. The cross-brace 127 is inserted into the first indentation 130a and placed on the coupled region 115, illustrated in FIG. 2A, of the first indentation 130a and the first extension 168a, a first end 129 of the cross-brace 127 contacts the first indentation 130a. The cross-brace 127 is adjacent to the first sidewall 132a and the second sidewall 132b and a clearance 131 may exist between the cross-brace 127 and the first sidewall 132a and the second sidewall 132b.

The cross-brace 133 is inserted into the second indentation 130b and placed on the coupled region 115, illustrated in FIG. 2A, of the second indentation 130b and the second extension 168b, a first end 135 of the cross-brace 133 contacts the second indentation 130b. The cross-brace 133 is adjacent to the third sidewall 132c and the fourth sidewall 132d, and a clearance 137 may exist between the cross-brace 133 and the third sidewall 132c and the fourth sidewall 132d. The clearance 131 and the clearance 137 are dependent on the shape and dimensions of the indentations 130a, 130b, and the cross-braces 127, 133 respectively. The cross-braces 127 and 133 extend over and are parallel to the bed floor 106, illustrated in FIG. 2A, and a second end (not shown) of the cross-braces 127 and 133 are supported on the coupled region 115 between the first indentation 130a and the first extension 168a, and the second indentation 130b and the second extension 168b, respectively.

Figure 3A:
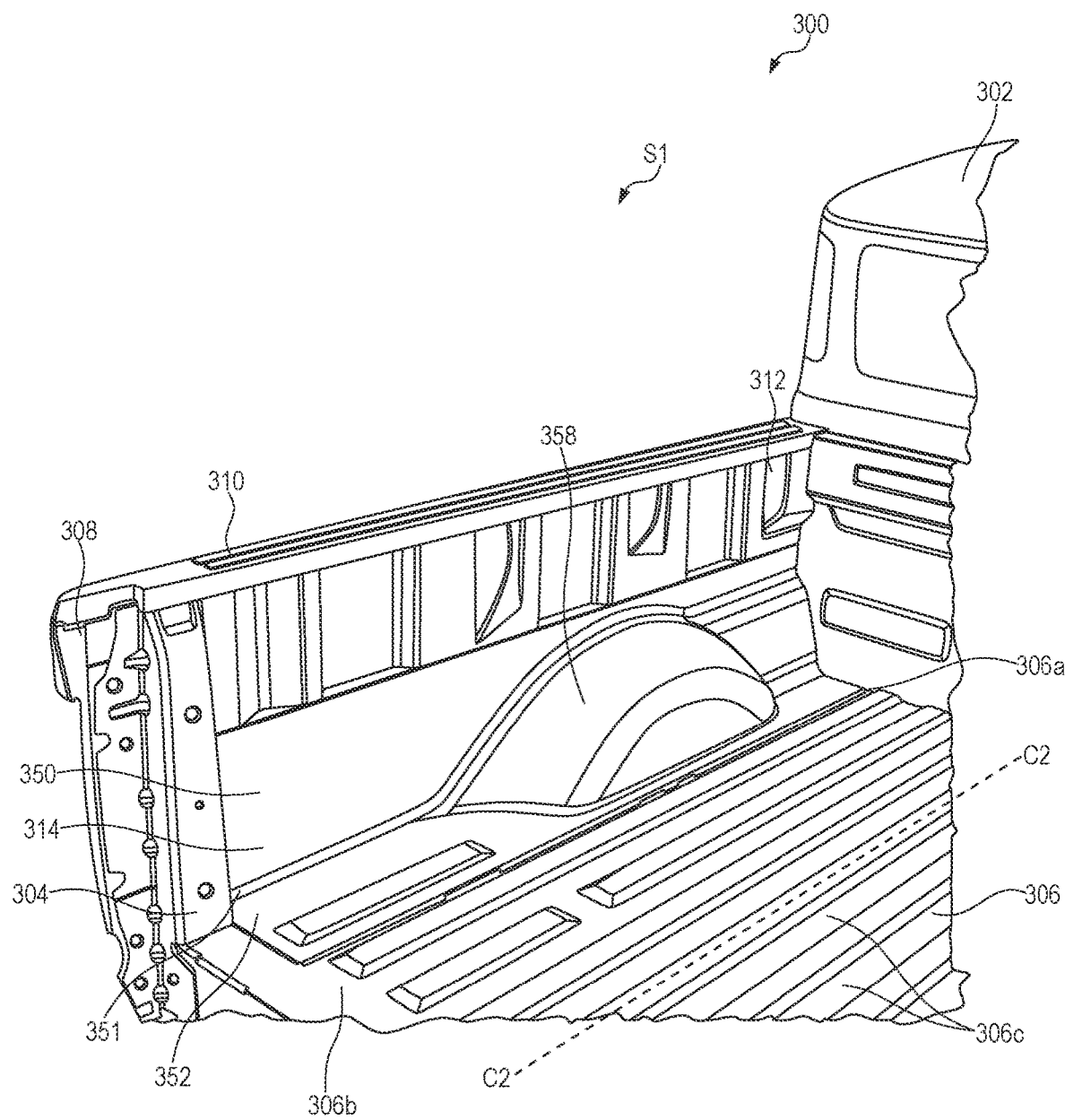
FIG. 3A is a rear perspective view of a vehicle with a set of panels, according to an embodiment of the present disclosure.
Figure 3B:
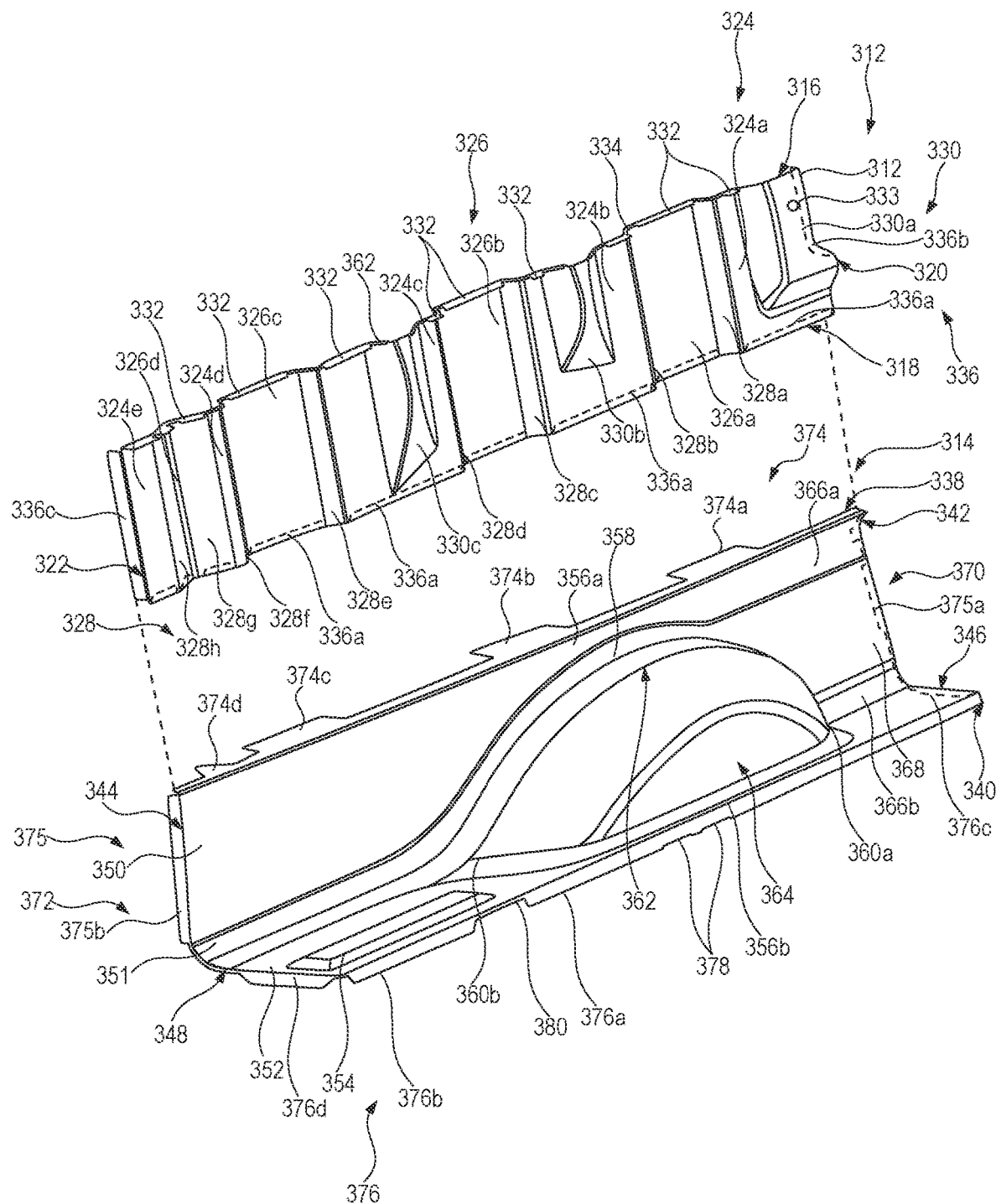
FIG. 3B is an exploded view of the set of panels positioned on a side of the vehicle of FIG. 3A.

FIG. 3A is a rear perspective view of a vehicle 300, such as a pick-up truck, with a set of panels 312, 314 on a first side 308 of the vehicle 300. FIG. 3B is an exploded view of the set of panels 312, 314. The vehicle 300 includes a passenger compartment 302, and a tailgate 304 similar to the vehicle 100 illustrated in FIG. 1A. The vehicle 300 includes the first side 308, a second side (not shown), and a bed floor 306 that are positioned in a way similar to the first side 108, the second side (not shown), and the bed floor 106 illustrated in FIG. 1A.

The first side 308 includes a first cover 310, and the set of panels 312, 314 that are positioned in a way similar to the panels 114, 116, respectively, described in FIG. 1A. The second side (not shown) includes a second cover, an upper, third panel, and a lower, fourth panel that are positioned similar to the third and fourth panels described in FIG. 1A. The panels 312, 314 respectively, may be coupled to the vehicle 300 in a way similar to the coupling of the panels 114, 116 respectively described in FIG. 1A.

The lower panel 314 includes a wheel well portion 358 and a body extension 352 that covers part of the bed of the truck, such that the lower panel has a substantially vertical portion and a substantially horizontal portion.

Referring to FIG. 3B, the panel 312 includes surfaces 316, 318 that are coupled to the first cover 310 and the panel 314, respectively of FIG. 3A. The panel 312 further includes a first-side surface 320 coupled to the passenger compartment 302 and a second-side surface 322 coupled to the tailgate 304 of the vehicle 300.

The panel 312 includes a plurality of indentations 326, a plurality of projections 324, and a plurality of sidewalls 328 extending between the surfaces 316, 318. The panel 312 extends between a cab-side 306a and a tailgate side 306b of the bed floor 306, as illustrated in FIG. 3A. The plurality of indentations 326 includes a first indentation 326a, a second indentation 326b, a third indentation 326c, and a fourth indentation 326d. The shape, dimension, order, and positioning of the plurality of indentations 326 may be similar to that of the plurality of indentations 130, illustrated in FIG. 1B.

The plurality of projections 324 includes a first projection 324a, a second projection 324b, a third projection 324c, a fourth projection 324d, and a fifth projection 324e. The shape, dimension, order, and positioning of the plurality of projections 324 may be similar to that of the plurality of projections 128, illustrated in FIG. 1B. The first projection 324a may include an aperture 333 similar to the aperture 136, illustrated in FIG. 1B. The plurality of projections 324 may also include one or more secondary structures 330 that face the bed floor 106, illustrated in FIG. 3A. The first, second, and third projections 324a, 324b, 324c, include secondary structures 330a, 330b, and 330c, respectively. The secondary structures 330 may be similar to the secondary structures 134 illustrated in FIG. 1B.

The plurality of sidewalls 328 includes a first sidewall 328a, a second sidewall 328b, a third sidewall 328c, a fourth sidewall 328d, a fifth sidewall 328e, a sixth sidewall 328f, a seventh sidewall 328g, and an eighth sidewall 328h. The shape, dimension, order, and positioning of the plurality of sidewalls 328 may be similar to that of the plurality of sidewalls 132, illustrated in FIG. 1B.

Each of the plurality of indentations 326, the plurality of projections 324, or the plurality of sidewalls 328 may be of different shapes and dimensions. For example, the fourth indentation 326d may have a curved surface unlike the first, second, and third indentations 326a, 326b, and 326c that can have a rectangular surface. In another alternate implementation, each of the plurality of indentations 326, the plurality of projections 324, or the plurality of sidewalls 328 may be of identical shapes and dimensions.

The panel 312 includes a plurality of tabs 332 and a plurality of tabs 336 that may support the coupling of the panel 312 to the first side 308 of the vehicle 300. The tabs 332, 336 may be substantially rectangular, square with curved edges, or of a parabolic shape. The plurality of tabs 336 includes one or more tabs 336a that extend away from the bed floor 306 and are positioned on the surface 318, adjacent to the indentations 326a, 326b, and 326c and the projections 324a, 324b, 324c, and 324e. Further, the tab 336a is positioned adjacent to the eighth sidewall 328h on the surface 318. The plurality of tabs 336 includes one or more tabs 336b positioned on the first-side surface 320 and one or more tabs 336c on the second-side surfaces 322, similar to the tabs 140c and the tabs 140b respectively, illustrated in FIG. 1B.

The surface 316 includes the plurality of tabs 332 on portions of the surface 316 that are adjacent to the first, second, third, and fifth projections 324a, 324b, 324c, and 324e respectively, which may extend completely or partially on the respective portions. The surface 316 may include the tabs 332 on portions that are adjacent to the first, second, and third indentations 326a, 326b, and 326c, respectively. The surface 316 may include the tabs 332 on portions that are adjacent to the seventh and eighth sidewalls 328g and 328h, respectively. Alternately, portions of the surface 316 adjacent to each of the plurality of projections 324, the plurality of indentations 326, and the plurality of sidewalls 328, may include the tabs 332.

The surface 316 may include one or more connector edges 334 that extend in-between the tabs 332. The first cover 310 is positioned over the connector edges 334 and the tabs 332. For example, the connector edges 334 are positioned on portions of the surface 316 located in-between the tabs 332, and the portions may be adjacent to the plurality of projections 324, the plurality of indentations 326, and the plurality of sidewalls 328. The connector edges 334 may extend on the portions of the surface 318 either partially or completely. The connector edges 334 and the tabs 332 on the surface 316 extend towards a center line C2-C2 of the vehicle 300, illustrated in FIG. 3A, and width of the connector edges 334 may be lesser than width of the tabs 332.

Similar to as described in the detailed description of FIG. 1B, the tabs 332, 336 on the surfaces 316, 318, respectively may differ from each other with respect to the shapes and dimensions.

The panel 314 includes surfaces 338, 340, where the surface 340 of the panel 314 is coupled to the bed floor 306. The panel 314 includes a first main body 350 that extends from the surface 338 of the panel 314 up to an intersection region (not shown) where the first side 308 is coupled to the bed floor 306. The first main body 350 is substantially parallel to an exterior wall (not shown) of the vehicle 300.

The panel 314 includes a second main body 352 that extends from the first main body 350 from the intersection region to the surface 340 of the panel 314 and overlaps a portion of the bed floor 306, illustrated in FIG. 3A. The first main body 350 extends and transitions to the second main body 352 using a curved segment 351 at the intersection region. The surface 340 along with the second main body 352 is coupled to and is substantially parallel to the bed floor 306 and transverse to the first main body 350. The second main body 352 may also include one or more ridge portions 354 to accommodate ridges 306c on the bed floor 306, illustrated in FIG. 3A, the shape and dimension of the ridge portions 354 corresponds with the shape and dimension of the ridges 306c.

The panel 314 may also include a wheel well portion 358, which is integrally formed with the first main body 350 and the second main body 352 to accommodate a wheel well (not shown) of the vehicle 300. The wheel well portion 358 is positioned above and coupled to the wheel well. The first main body 350 includes a first strip portion 356a between the wheel well portion 358 coupled to the first main body 350 and the surface 338. The second main body 352 includes a second strip portion 356b between the wheel well portion 358 coupled to the second main body 352 and the surface 340.

The panel 314 includes portions 370, 372 adjacent to a cab-side 360a and a tailgate side 360b of the wheel well portion 358. The portions 370, 372 include the first and the second main body 350, 352, respectively. The wheel well portion 358 includes a curved upper surface 362 that extends between the portions 370, 372.

The wheel well portion 358 also includes an interior surface 364 transverse to the bed floor 306, extending in between the portions 370, 372. The interior surface 364 is positioned between the curved upper surface 362 and the bed floor 306. The interior surface 364 is substantially parallel to the first main body 350 and is closer to the center line C2-C2, illustrated in FIG. 3A, as compared to the first main body 350.

The portion 370 is adjacent to the passenger compartment 302 and includes a protrusion portion 368 between a third strip portion 366a and a fourth strip portion 366b. The portion 370 is similar to the portion 150, illustrated in FIG. 1B.

The panel 314 includes a plurality of extensions 374 on the surface 338 that extends away from the bed floor 306 and towards the exterior wall (not shown) of the first side 308. The plurality of extensions 374 includes a first extension 374a, a second extension 374b, a third extension 374c, and a fourth extension 374d. The plurality of extensions 374 and the plurality of indentations 326 are positioned and coupled to achieve the snug fit in a way similar to coupling and positioning of the plurality of extensions 168 and the plurality of indentations 130 illustrated in FIG. 1B.

The panel 314 includes a plurality of tabs 376 on the surface 340, which extends in a direction opposite to the plurality of extensions 374, and towards the bed floor 306, overlapping a portion of the bed floor 306. A tab 376a extends from the passenger compartment 302 to the tailgate side 360b of the wheel well portion 358 and may include one or more notches 378 in-line with the wheel well portion 358. A tab 376b may be positioned on the surface 340 in-line with the portion 372 and a groove 380 may be positioned in between the tabs 376a and 376b on the surface 340.

The panel 314 may include one or more tabs 376c on a fifth-side surface 346 and one or more tabs 376d on a sixth-side surface 348. The fifth-side surface 346 is positioned between the second main body 352 and the passenger compartment 302 and the sixth-side surface 348 is positioned between the second main body 352 and the tailgate 304. The plurality of tabs 376 on the fifth-side surface 346, the sixth-side surface 348, and the surface 340 may extend towards the bed floor 306.

The panel 314 may further include a plurality of tabs 375 with one or more tabs 375a positioned on a third-side surface 342 and with one or more tabs 375b positioned on a fourth-side surface 344. The third-side surface 342 is positioned between the first main body 350 and the passenger compartment 302 and the fourth-side surface 344 is positioned between the first main body 350 and the tailgate 304. The plurality of tabs 375 on the third-side surface 342 and the fourth-side surface 344 extends away from the bed floor 306 and towards the exterior wall (not shown) of the vehicle 300.

The plurality of tabs 375 facilitates coupling of the panel 314 with the first side 308. The plurality of tabs 376 of the panel 314 facilitate coupling of the panel 314 with the bed floor 306 of the vehicle 300.

The third and the fourth panels on the second side of the vehicle 300 include a plurality of indentations and extensions that are similar in positioning compared to the plurality of indentations 326 and the plurality of extensions 374 on the panels 312, 314, respectively. The combination of the plurality of indentations 326 and the plurality of extensions 374 on the first side 308 and the combination of the plurality of indentations and the plurality of extensions on the second side creates flat horizontal pockets, similar to as disclosed in FIGS. 1A and 1B. The flat horizontal pockets hold support structures, such as a pair of cross-braces (not shown), similar to the cross-brace 123 illustrated in FIG. 2A, securely that can support a platform to form a two tiered-storage similar to as disclosed in the detailed description of FIGS. 1A and 1B.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A vehicle, comprising:
   a bed floor;
   a first side that includes:
      a first panel; and
      a second panel that is between the first panel and the bed floor;
   a second side spaced from the first side by the bed floor, the second side including:
      a third panel; and
      a fourth panel that is between the third panel and the bed floor,
      wherein the first panel of the first side includes a plurality of indentations and the second panel of the first side includes a plurality of extensions, ones of the plurality of extensions extend into ones of the plurality of indentations.

2. The vehicle of claim 1 wherein the first side includes a first top surface and the second side include a second top surface, the first panel is between the first top surface and the second panel and the third panel is between the second top surface and the fourth panel.

3. The vehicle of claim 1 wherein the first panel includes a first indentation that extends from a top surface to a bottom surface of the first panel and the second panel includes a first extension at a top surface of the second panel, the first extension extends into the first indentation of the first panel adjacent to the bottom surface of the first panel.

4. The vehicle of claim 3 wherein the second panel includes a bottom surface that is coupled to the bed floor.

5. The vehicle of claim 4, further comprising a wheel well, the second panel including a first portion on a cab-side of the wheel well and a second portion on a tailgate side of the wheel well, the second panel including a central portion between the first and second portion that includes a curved edge coupled to the wheel well.

6. The vehicle of claim 5 wherein the second panel includes a second extension from the top surface and aligned with the wheel well.

7. The vehicle of claim 6 wherein the first panel includes a second indentation, the second extension extending into the second indentation.

8. The vehicle of claim 3 wherein the second panel includes a second extension that extends from a bottom surface of the second panel, the second extension extends in a direction opposite to the first extension and overlaps a portion of the bed floor.

9. The vehicle of claim 8 wherein the second panel includes a wheel well coupled between the first extension and the second extension.

10. A vehicle, comprising:
a passenger compartment;
a tailgate;
a bed floor between the passenger compartment and the tailgate;
a side that extends between the passenger compartment and the tailgate, the side extending away from and coupled to the bed floor, the side including:
a first panel having a first indentation; and
a second panel between the first panel and the bed floor, the second panel having a first extension that extends into the first indentation.

11. The vehicle of claim 10 wherein the second panel includes a first main body that extends from a first edge that includes the first extension to a second edge that is coupled to the bed floor.

12. The vehicle of claim 11 wherein the second panel includes a second main body that overlaps a portion of the bed floor and extends from the first main body.

13. The vehicle of claim 12 wherein the second panel includes a wheel well that is integrally formed with the first main body and the second main body.

14. The vehicle of claim 13 wherein the second panel includes a second extension from the first edge and the first panel includes a second indentation, the second extension being positioned in the second indentation.

15. A pick-up truck, comprising:
a bed having:
a floor;
a first side having:
an upper panel having a top surface, a bottom surface, a first bed-facing surface that extends between the top surface and the bottom surface, and a second bed-facing surface that extends between the top surface and the bottom surface, the second bed-facing surface being further from a center line of the bed than the first bed-facing surface; and
a lower panel having a top surface, a bottom surface, and a first extension that extends from the top surface, the first extension being adjacent to the second bed-facing surface.

16. The pick-up truck of claim 15 wherein the upper panel includes a sidewall between the first bed-facing surface and the second bed-facing surface, the first extension being adjacent to the sidewall.

17. The pick-up truck of claim 16 wherein the lower panel includes a wheel well between the top surface and the bottom surface.

18. The pick-up truck of claim 17 wherein the bottom surface of the lower panel overlaps a portion of the floor.

* * * * *